UNITED STATES PATENT OFFICE 2,295,559

PYRIMIDYL CYANOALKYL SULPHIDES

Gaetano F. D'Alelio and James W. Underwood, Pittsfield, Mass., assignors to General Electric Company, a corporation of New York No Drawing. Application May 27, 1941, Serial No. 395,425

11 Claims. (Cl. 260—251)

This invention relates to new chemical compounds and more particularly to pyrimidine derivatives. The invention especially is concerned with the production of new and useful pyrimidyl cyanoalkyl sulphides.

The pyrimidyl cyanoalkyl sulphides of this invention may be illustrated graphically by the following general formula:

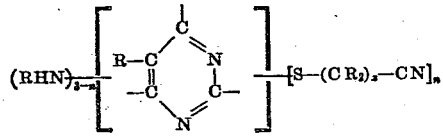

In the above formula $n$ represents an integer and is at least 1 and not more than 3, $x$ is an integer and is at least 1 and not more than 2, and R represents a member of the class consisting of hydrogen and monovalent hydrocarbon and halohydrocarbon radicals, numerous examples of which hereafter are given. Since $x$ represents an integer which is 1 or 2, it will be seen that the linkage of the cyanoalkyl group to the sulphur atom in all cases will be alpha or beta to the cyano group. It also will be observed that linkage of the pyrimidyl grouping to the sulphur atom is through a carbon atom. From a consideration of the formula it further will be seen that when $n$ is 3 there will be no amino groups attached to the pyrimidyl nucleus.

Illustrative examples of monovalent hydrocarbon radicals which R in the above formula may be are alkyl (e. g., methyl, ethyl, propyl, isopropyl, butyl, secondary butyl, isobutyl, amyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl, naphthyl, etc.); alkaryl (e. g., tolyl, xylyl, ethylphenyl, propylphenyl, isopropylphenyl, etc.); aralkyl (e. g., benzyl, phenylethyl, phenylpropyl, etc.); and their homologues, as well as those groups with one or more of their hydrogen atoms substituted by, for example, a halogen. Specific examples of halogeno-substituted hydrocarbon radicals are chlormethyl, chlorcyclohexyl, chlorphenyl, dichlorphenyl, ethyl chlorphenyl, phenyl chlorethyl, bromethyl, bromtolyl, etc. Preferably R is hydrogen.

Our new pyrimidyl cyanoalkyl sulphides may be used as chemotherapeutic agents and, also, as intermediates in the preparation of other compounds. For example, they may be employed as intermediates in the preparation of derivatives thereof such as imido ether, amidine, acyl, ureido, hydrazino, etc., derivatives of the individual pyrimidyl cyanoalkyl sulphide. These new organic sulphides are especially valuable as reactants in the preparation of synthetic resinous compositions. Thus, they may be condensed with, for instance, aldehydes, including polymeric aldehydes and aldehyde-addition products, to yield condensation products of particular utility in the plastics and coating arts. Such condensation products are more fully described and claimed in our copending application Serial No. 395,424, filed concurrently herewith and assigned to the same assignee as the present invention. In our copending application Serial No. 441,862, filed May 5, 1942, which application is a continuation-in-part of the present application and of application Serial No. 395,424, we have more fully described and have specifically claimed compositions of matter comprising the product of reaction of ingredients comprising an aldehyde and a compound corresponding to the general formula

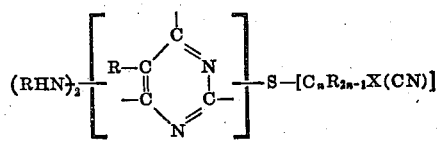

where $n$ represents an integer and is at least 1 and not more than 2, R represents a member of the class consisting of hydrogen and monovalent hydrocarbon and halo-hydrocarbon radicals, and X represents a halogen atom. The aldehyde addition products of our new pyrimidyl cyanoalkyl sulphides also may be compounded with rubber, both natural and synthetic, to modify the properties of the rubber.

Various methods may be employed to produce the chemical compounds of this invention. We prefer to prepare them by effecting reaction between a mercapto pyrimidine and a mono-halogenated alkyl nitrile in the presence of a hydrohalide acceptor. Illustrative examples of mercapto pyrimidines which may be used, depending upon the particular pyrimidyl cyanoalkyl sulphide desired, are:

4,6-diamino 2-mercapto pyrimidine
2,6-diamino 5-ethyl 4-mercapto pyrimidine
6-amino 2,4-dimercapto pyrimidine
2-amino 5-benzyl, 4,6-dimercapto pyrimidine
5-methyl 2,4,6-trimercapto pyrimidine
2,4,6-trimercapto pyrimidine
4,6-di-(methylamino) 2-mercapto pyrimidine
4,6-dianilino 2-mercaptopyrimidine
2,6-di(cyclohexylamino) 4-mercapto pyrimidine
4,6-ditoluido 5-phenyl 2-mercapto pyrimidine
4-benzylamino 6-methylamino 2-mercapto pyrimidine, which also may be named 4-methylamino 6-benzylamino 2-mercapto pyrimidine Typical examples of mono-halogenated alkyl nitriles which may be employed, depending upon the particular end-product sought, are Chloracetonitrile
Alpha-chlorpropionitrile
Beta-brompropionitrile
Beta-chlorbutyronitrile
Phenyl chloracetonitrile
Beta-bromo gamma-cyclohexyl butyronitrile
Beta-chloro alpha-ethyl propionitrile
Alpha-bromo alpha-methyl beta-chlorphenyl butyronitrile Illustrative examples of hydrohalide acceptors that may be used are the inorganic bases, e. g., the alkali-metal hydroxides (sodium hydroxide, potassium hydroxide, etc.), calcium hydroxide, barium hydroxide, ammonium hydroxide, etc., the carbonates of such bases, and the organic bases, e. g., tertiary amines such, for instance, as trimethyl amine, tributyl amine, dimethyl aniline, pyridine, quinoline, etc., quaternary ammonium bases (e. g., tetramethyl ammonium hydroxide, etc.), and the like. Preferably the hydrohalide acceptor is one that will react with the mercapto pyrimidine to form a water-soluble salt. Examples of such preferred acceptors are sodium and potassium hydroxides.

The reaction between the mercato pyrimidine and the mono-halogenated alkyl nitrile may be carried out in any suitable manner, but preferably is effected in the presence of a suitable solvent or mixture of solvents. Although various solvents or solvent mixtures may be employed we prefer, for economic reasons and because of their eminent suitability, to use water or a mixture of water and alcohol. The reaction may be carried out under a variety of temperature and pressure conditions, for instance at normal or at elevated temperatures and at atmospheric, sub-atmospheric or super-atmospheric pressures.

The above reaction may be represented by the following general equation:

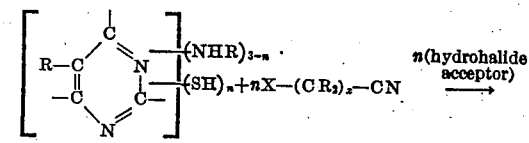

II

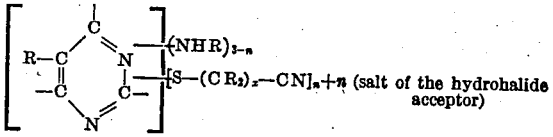

In the above equation X represents halogen and R, $n$ and $x$ have the same meanings as given above with reference to the general Formula I for the pyrimidyl cyanoalkyl sulphides of this invention.

The chemical compounds of this invention also may be prepared by effecting reaction between a halo-pyrimidine and a mono-mercapto alkyl nitrile in the presence of a hydrohalide acceptor. This reaction may be carried out by any suitable means but preferably is effected in the presence of an anhydrous solvent, e. g., alcohol. The other conditions of reaction may be the same as described above with reference to the first-mentioned method of preparation.

Illustrative examples of halogenated pyrimidines which may be used, depending upon the desired end-product, are:

6-chloro 2,4-diamino pyrimidine
6-iodo 2,4-diamino pyrimidine
4,6-dichloro 2-amino pyrimidine
4,6-dichloro 5-methyl 2-amino pyrimidine
2,4,6-trichloro pyrimidine
6-chloro 2,4-di-(methylamino) pyrimidine
4-chloro 2-amino 6-anilino pyrimidine
2-chloro 4-toluido 6-ethylamino pyrimidine
4,6-dibromo 2-cyclohexylamino 5-phenyl pyrimidine
6-iodo 2,4-di-(benzylamino) 5-benzyl pyrimidine Illustrative examples of mono-mercapto alkyl nitriles which may be used, depending upon the particular pyrimidyl cyanoalkyl sulphide desired, are:

Mercapto acetonitrile
Beta-mercapto propionitrile
Alpha-mercapto butyronitrile
Beta-mercapto alpha-phenyl propionitrile
Beta-mercapto beta-chlorphenyl propionitrile
Beta-mercapto alpha-benzyl alpha-methyl butyronitrile
Alpha-mercapto beta-tolyl butyronitrile The hydrohalide acceptor may be the same as described above with reference to the first-named method of preparing the compounds of this invention.

The general reaction for this alternative method of preparing our new chemical compounds is illustrated by the following equation:

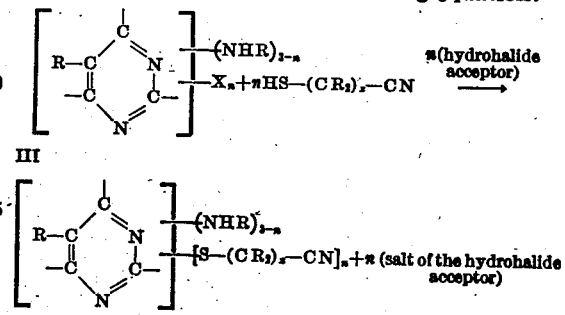

In this equation R, X, $n$ and $x$ have the same meanings as defined hereinbefore with reference to Formula I and Equation II.

A more specific illustration of how these new compounds may be prepared is described below with reference to the preparation of 4,6-diamino pyrimidyl-2 cyanomethyl sulphide, the formula for which is

IV

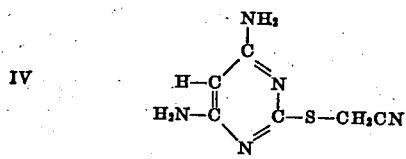

All parts are by weight.

*Example*

| | Parts |
|---|---|
| 4,6-diamino 2-mercapto pyrimidine | 158 |
| Chloracetonitrile (mono-chloracetonitrile | 84 |
| Sodium hydroxide (hydrohalide acceptor) | 44 |

The diamino mercapto pyrimidine and the sodium hydroxide were dissolved in a solvent comprising 2,000 parts water and 2,000 parts alcohol. The chloracetonitrile was added to the resulting solution. The mixture was stirred at room temperature for 24 hours. By this time a precipitate of the product (4,6-diamino pyrimidyl-2 cyanomethyl sulphide) had formed. In order to insure a complete reaction the mix was heated for one hour on a boiling water bath. The mixture was cooled. The product was filtered off and washed well with hot water. A yield of 159 parts of 4,6-diamino pyrimidyl-2 cyanomethyl sulphide was obtained. More could be recovered from the mother liquor by evaporation.

As will be readily understood by those skilled in the art, when it is desired to produce compounds containing a single monoamino pyrimidyl grouping and two cyanoalkyl sulphide groupings or compounds containing a pyrimidyl grouping and three cyanoalkyl sulphide groupings, then the starting reactants and proportions of reactants are chosen so as to yield the desired products in accordance with methods such as above given by way of illustration.

From the foregoing description it will be seen that the present invention provides new and useful pyrimidyl cyanoalkyl sulphides, examples of which are pyrimidyl tri-(cyanomethyl sulphide), pyrimidyl tri-(cyanoethyl sulphide), the monoamino pyrimidyl di-(cyanomethyl sulphides), the monoamino pyrimidyl di-(cyanoethyl sulphides), the diamino pyrimidyl mono-(cyanomethyl sulphides) and the diamino pyrimidyl mono-(cyanoethyl sulphides). Other and more specific examples of these new compounds are shown below:

V
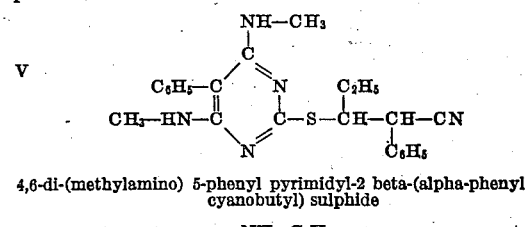
4,6-di-(methylamino) 5-phenyl pyrimidyl-2 beta-(alpha-phenyl cyanobutyl) sulphide VI
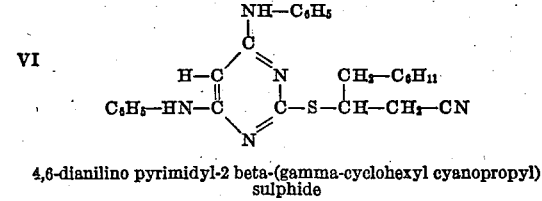
4,6-dianilino pyrimidyl-2 beta-(gamma-cyclohexyl cyanopropyl) sulphide VII
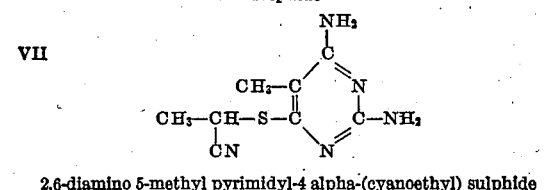
2,6-diamino 5-methyl pyrimidyl-4 alpha-(cyanoethyl) sulphide
[2,4-diamino 5-methyl pyrimidyl-6 alpha-(cyanoethyl) sulphide]

VIII
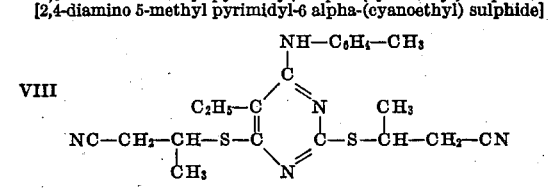
[6-toluido 5-ethyl pyrimidyl-2,4 di-(beta-cyanopropyl sulphide)]

IX
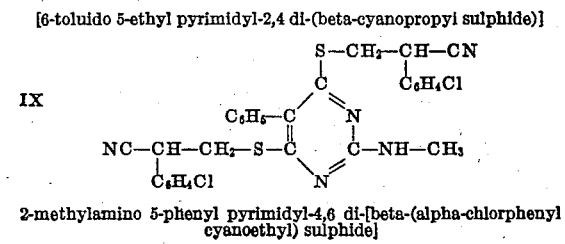
2-methylamino 5-phenyl pyrimidyl-4,6 di-[beta-(alpha-chlorphenyl cyanoethyl) sulphide]

X
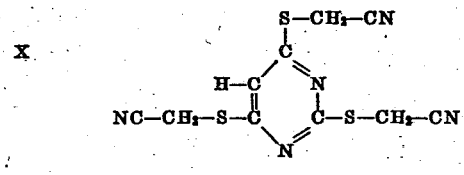
Pyrimidyl-2,4,6 tri-(cyanomethyl sulphide)

XI
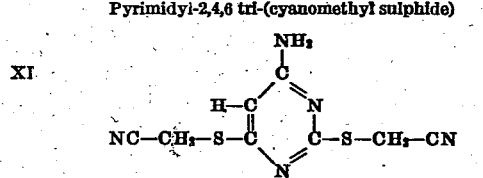
6-amino pyrimidyl-2,4 di-(cyanomethyl sulphide)
[4-amino pyrimidyl-2,6 di-(cyanomethyl sulphide)]

XII
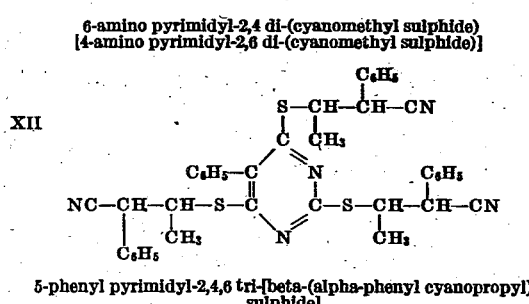
5-phenyl pyrimidyl-2,4,6 tri-[beta-(alpha-phenyl cyanopropyl) sulphide]

XIII
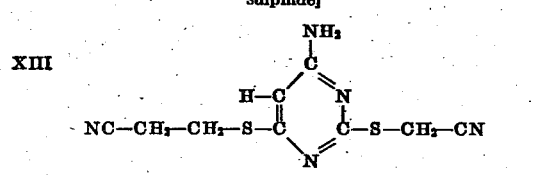
6-amino pyrimidyl 2-cyanomethyl 4-beta-cyanoethyl disulphide

XIV
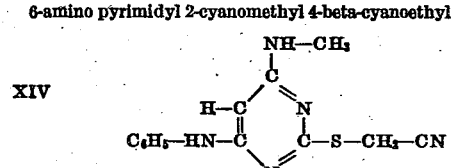
4-anilino 6-methylamino pyrimidyl-2 cyanomethyl sulphide

XV
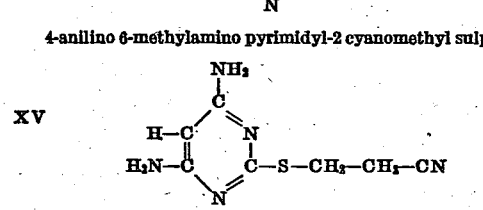
4,6-diamino pyrimidyl-2 beta-cyanoethyl sulphide

XVI
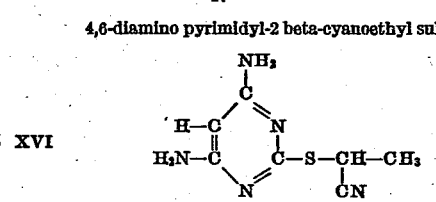
4,6-diamino pyrimidyl-2 alpha-cyanoethyl sulphide

What we claim as new and desire to secure by Letters Patent of the United States is:

1. Chemical compounds corresponding to the general formula

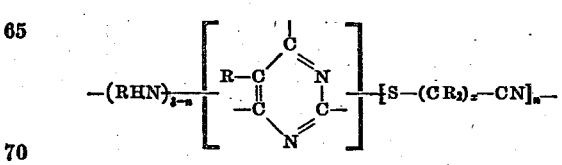

where $n$ is an integer and is at least 1 and not more than 3, $x$ is an integer and is at least 1 and not more than 2, and R is a member of the class consisting of hydrogen and monovalent hydrocarbon and halo-hydrocarbon radicals.

2. Chemical compounds as in claim 1 wherein R represents hydrogen.

3. Chemical compounds as in claim 1 wherein R represents hydrogen and $x$ is 1.

4. Pyrimidyl-2,4,6 tri-(cyanomethyl sulphide).

5. A monoamino pyrimidyl di-(cyanomethyl sulphide).

6. 6-aminopyrimidyl-2,4 di-(cyanomethyl sulphide).

7. A diamino pyrimidyl cyanomethyl sulphide.

8. 4,6-diamino pyrimidyl-2 cyanomethyl sulphide.

9. The method of preparing chemical compounds corresponding to the general formula

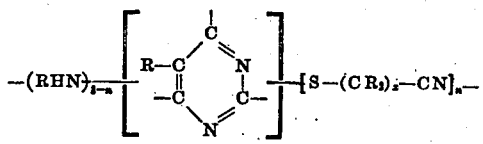

where $n$ is an integer and is at least 1 and not more than 3, $x$ is an integer and is at least 1 and not more than 2, and R is a member of the class consisting of hydrogen and monovalent hydrocarbon and halo-hydrocarbon radicals, said method comprising effecting reaction, in the presence of a hydrohalide acceptor, between (1) a mercapto pyrimidine corresponding to the general formula

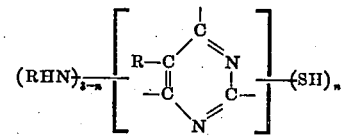

where $n$ and R have the meanings above given, and (2) mono-halogenated alkyl nitrile corresponding to the general formula $$nX—(CR_2)_x—CN$$

where X represents halogen and R, $n$ and $x$ have the meanings above given.

10. A method as in claim 9 wherein the hydrohalide acceptor is an alkali-metal hydroxide.

11. The method of preparing 4,6-diamino pyrimidyl-2 cyanomethyl sulphide which comprises effecting reaction, in the presence of a hydrohalide acceptor, between 4,6-diamino 2-mercapto pyrimidine and chloracetonitrile.

GAETANO F. D'ALELIO.
JAMES W. UNDERWOOD.